Figure 1:
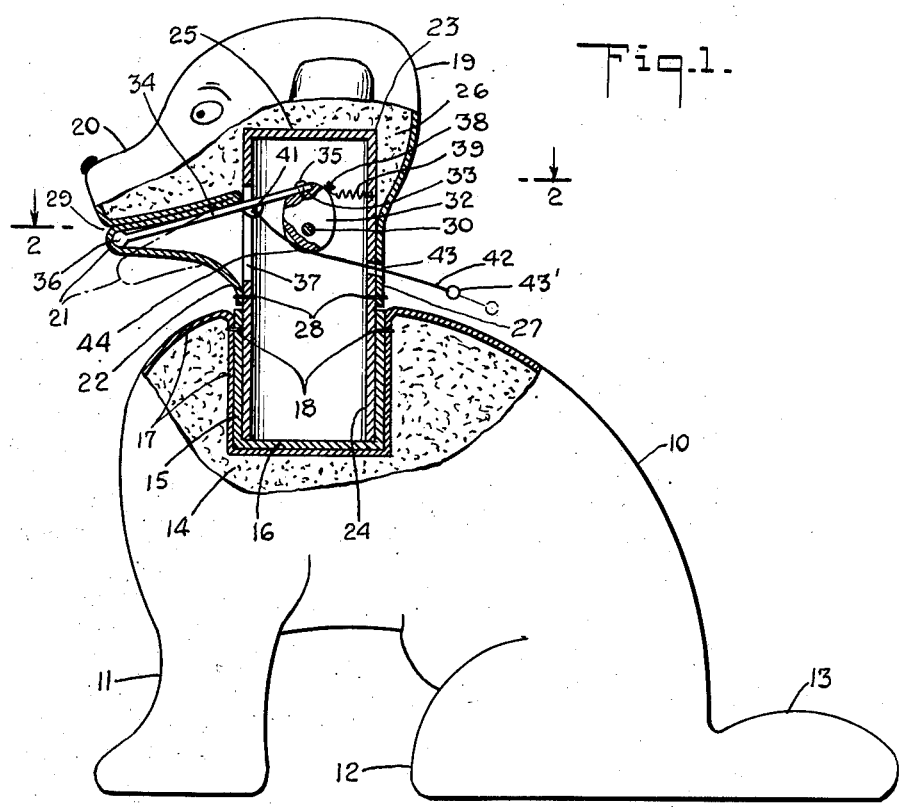

July 9, 1957      A. PLACHTER      2,798,334

MOVABLE MOUTH FIGURE

Filed March 6, 1956

INVENTOR.
ABRAHAM PLACHTER
BY
Howard Thompson
ATTORNEY.

United States Patent Office 2,798,334
Patented July 9, 1957

2,798,334

MOVABLE MOUTH FIGURE

Abraham Plachter, Brooklyn, N. Y., assignor of one-half to Fay Schwartz, Brooklyn, N. Y.

Application March 6, 1956, Serial No. 569,781

3 Claims. (Cl. 46—126)

This invention relates to various types and kinds of figured toys or the like, preferably in the form of animals and generally of the stuffed type, wherein a tongue operating mechanism is in the form of a unit mounted within the head and neck portion of the figure with means externally of the figure for actuating the mouth to simulate talking.

More particularly, the invention deals with a figure of the character described, wherein the body portion is provided with a cup insert, in which the mechanism of the head is mounted and supported, as well as rotatably mounted to facilitate rotation of the head with respect to the bottom of the figure.

Figure 2:
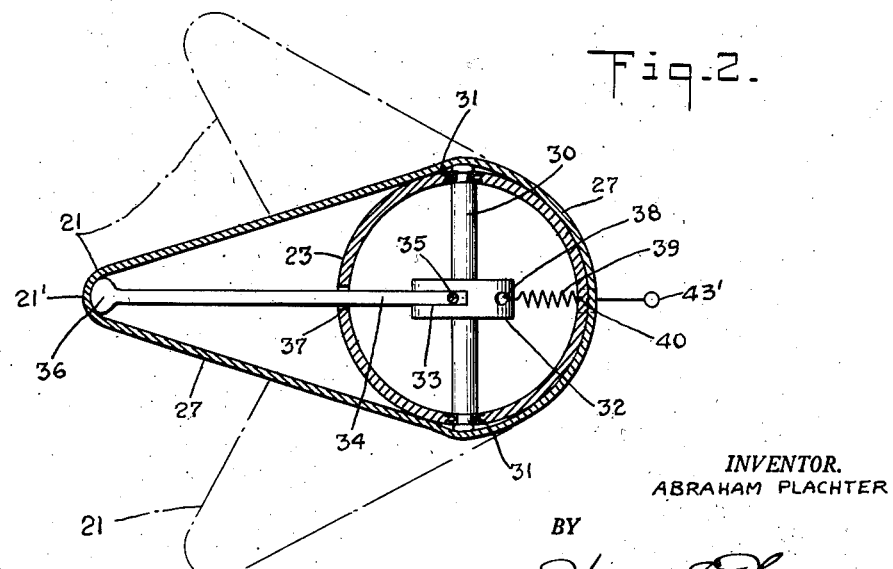

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic side and sectional view of a dog showing my improved lip operating mechanism for movement of the lower lip in simulating talking; and Fig. 2 is a section, substantially on the line 2—2 of Fig. 1, omitting all of the background showing.

While my invention is applicable for figures of any shape or character, it is preferred that the figure be made in the form of an animal and, in the accompanying drawing to illustrate one adaptation and use of my invention, I have shown, at 10, the body portion of a dog arranged in a seated position, 11 representing the front legs, 12 the rear legs and 13 the tail. In the present illustration, a stuffed figure or animal is shown, 14 representing the stuffing material of the body.

Embedded and secured in the body 10, at the upper neck portion thereof, is a cup 15 of any suitable material, 16 representing the bottom wall of the cup and, in constructing the body 10, the facing material 17 of the body is carried down around the cup 15 for support of the cup firmly at the upper portion of the body and suitable fastenings, as at 18, are provided to secure the cup to the facing material 17.

At 19 is shown the head of the dog having a protruding nose and upper mouth portion 20 and a lower lip and chin 21, the latter extending into the neck portion 22 of the head, as clearly noted.

Mounted in the head is an elongated cylinder 23, the lower end portion 24 of which fits snugly but freely in the cup 15 and rests upon the bottom wall 16 of the cup. The cylinder 23 includes a top wall 25 to facilitate placement of the stuffing 26 in the head around the cylinder. However, no stuffing is arranged in the lower lip and chin portion 21.

It will be noted, from a consideration of Fig. 1 of the drawing, that the facing material 27 of the head 19 extends downwardly onto the neck 22 and is secured to the cylinder 23, as indicated at 28. This facing material extends continuously over the chin and lower lip and upper lip and nose portion, so that, in moving the lower lip and chin downwardly, as indicated in dotted lines in Fig. 1, the mouth 29 is opened.

The cylinder 23 constitutes part of a lip and chin operating mechanism which, in its entirety, is mounted within the head 19. This mechanism comprises a shaft 30 mounted in opposed walls of the cylinder 23 and, where the cylinder is composed of material which would require reinforcement, reinforcing bearings 31 will be provided. The shaft 30 is arranged at right angles to the lower lip and chin 21, as will clearly appear from a consideration of Fig. 2 of the drawing.

Fixed centrally of the shaft 30 is an eccentric block or wheel 32, the upper eccentric portion of which is recessed, as seen at 33, to key an operating finger 34 therein, the finger being fixed in position in the recess 33 by a screw 35. The finger 34 has, at its outer end, an enlarged rounded portion 36 which is positioned at the outer pointed extremity 21' of the lip 21, as clearly noted in Fig. 2. The finger 34 extends outwardly through a vertically elongated aperture 37 in the cylinder 23 to facilitate vertical movement of the lip 21, as will be apparent. Fixed to the top of the eccentric, as at 38, is a spring 39 which is also fixed to the cylinder, as seen at 40. The spring serves to normally hold the lip 21 in raised or closed position. Fixed to the finger 34, as at 41, note Fig. 1, is an operating cord or strand 42, which extends out through an opening 43 in the cylinder 23 and also in the neck portion of the facing 27, the outer end of the strand 42 having a fingerpiece or ring 43'; whereby, the finger 34 can be moved downwardly against the action of the spring 39 in moving the lip or chin into lowered positions.

The lower portion of the eccentric block 32 is recessed, as seen at 44, to guide the strand 42. It will be apparent, from the foregoing statement, that the actuating mechanism comprising the cylinder 23 eccentric 32 mounted on the shaft 30, the finger 34 and spring 39, including the strand 42, constitutes a pre-assembled unit, which can be fitted into the head and neck portion of a figure of any type or kind in the course of constructing said head and neck portion and the supporting cup 15, which indirectly constitutes part of the mechanism is fitted into the body portion of the figure in the construction of the latter; whereupon, the cylinder 23 of the mechanism assembled in the head is inserted into the cup and can be frictionally held against displacement therein or, if desired, means can be provided to retain the parts against relative displacement.

It will be apparent that, in the rotation of the head 19, as indicated in dotted lines in Fig. 2 of the drawing, the lower lip and chin 21 can be operated to simulate talking. In this manner, the figure can be manipulated to create amusing entertainment for both young and old. In this connection, it will be apparent that the degree of opening of the mouth by lowering of the lip and chin 21 will characterize words which are announced by the operator, the facing material 27 constituting the interior of the mouth of the lower lip and chin, including the chin extending to the neck portion being unstuffed is freely flexible to compensate for movement of the finger 34. The finger 34 actually supports the lower lip and chin in its extended shaped position to conform with the rest of the head and this is clearly indicated by the converging walls of the facing 27, as noted in Fig. 2 of the drawing. This keeps the upper facing portion of the lower lip and mouth transversely firm within reasonable limits. The structure simulates a hinging of the lower lip with the head in actual operation of the mechanism.

Having fully described my invention, what I claim as new and desire to secure by Letters Patent is:

1. A figure of the character described, comprising a body, a cup supported in and opening outwardly through the upper portion of the body, a unit detachably and rotatably mounted in said cup, said unit comprising a head, upper mouth portion, lower lip and neck portion, a cylinder mounted in the head and neck of said unit and protruding therefrom to seat and rotate in the cup of said body, the lower lip having flexible walls constituting part of facing material of the head unit, an eccentric pivotally mounted and housed within said cylinder, an elongated finger fixed to the eccentric and extending freely through the cylinder to an outer contracted end of the lower lip in support of the flexible walls of said lip in extended position, yieldable means within the cylinder coupled with the eccentric and the cylinder for normally supporting said finger to retain the lower lip in closed position upon the upper mouth portion, and a manually operated strand connected to said finger for actuating said eccentric against the action of said yielding means for movement of the lower lip into open position.

2. A figure of the character described, comprising a body, a cup supported in and opening outwardly through the upper portion of the body, a unit detachably and rotatably mounted in said cup, said unit comprising a head, upper mouth portion, lower lip and neck portion, a cylinder mounted in the head and neck of said unit and protruding therefrom to seat and rotate in the cup of said body, the lower lip having flexible walls constituting part of facing material of the head unit, an eccentric pivotally mounted and housed within said cylinder, an elongated finger fixed to the eccentric and extending freely through the cylinder to an outer contracted end of the lower lip in support of the flexible walls of said lip in extended position, yieldable means within the cylinder coupled with the eccentric and the cylinder for normally supporting said finger to retain the lower lip in closed position upon the upper mouth portion, a manually operated strand connected to said finger for actuating said eccentric against the action of said yielding means for movement of the lower lip into open position, and said cylinder, at the neck portion of the unit and above said body, having an aperture, through which the strand passes for external accessibility.

3. In figures of the character described employing a body having a cup opening through the upper portion thereof and a removable head and neck portion, an operating unit, said unit comprising an elongated tubular member arranged vertically in the head and neck portion, said member projecting below the neck portion for detachable and rotatable mounting in the cup of said body, means comprising a shaft traversing said tubular member forming a pivotal axis for an eccentric housed within said member, an elongated finger fixed to the eccentric and extending freely through said member into a lower flexible lip portion of said head for movement of the lower lip portion into open and closed positions, tensional means within said member and coupled with said eccentric and tubular member for normally supporting the finger with the lower lip in closed position, and manually operated means connected to said finger accessible externally of said member, outwardly of the body of the figure, for actuating the eccentric in movement of the lower lip into open position against the action of said tensional means.

References Cited in the file of this patent

UNITED STATES PATENTS

| | | |
|---|---|---|
| 1,374,343 | Wiener | Aug. 12, 1921 |
| 2,114,851 | McCown | Apr. 19, 1938 |
| 2,202,677 | Usinskis | May 28, 1940 |
| 2,633,670 | Steuber | Apr. 7, 1953 |
| 2,661,572 | Baggott | Dec. 8, 1953 |